(12) United States Patent
Oikawa et al.

(10) Patent No.: US 6,673,475 B2
(45) Date of Patent: Jan. 6, 2004

(54) MAGNETIC RECORDING MEDIUM AND MANUFACTURING METHOD THEREFORE

(75) Inventors: Tadaaki Oikawa, Nagano (JP); Hiroyuki Uwazumi, Nagano (JP); Takahiro Shimizu, Nagano (JP); Naoki Takizawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 79 days.

(21) Appl. No.: 09/976,248

(22) Filed: Oct. 11, 2001

(65) Prior Publication Data

US 2002/0114975 A1 Aug. 22, 2002

(30) Foreign Application Priority Data

Oct. 13, 2000 (JP) .......................... 2000-314389
Dec. 11, 2000 (JP) .......................... 2000-376597

(51) Int. Cl.⁷ .............................. G11B 5/66; G11B 5/70
(52) U.S. Cl. ............................. 428/694 T; 428/694 TS; 428/694 TP; 428/336; 428/900; 427/128; 427/130; 427/131
(58) Field of Search .................... 428/694 TS, 900, 428/336, 694 TP, 694 T; 427/131, 130, 128

(56) References Cited

U.S. PATENT DOCUMENTS 5,679,473 A  10/1997  Murayama et al. ......... 428/694
5,736,262 A * 4/1998 Ohkijima et al. .......... 428/611
5,800,931 A * 9/1998 Lee et al. ................... 428/611

FOREIGN PATENT DOCUMENTS

JP       08255342       10/1996

OTHER PUBLICATIONS

Effect of a Cr–Mo Underlayer on a CoPt–SiO2 Thin Film, Journal of Japan Society of Applied MAgnetics, by H. Ryonai, T. Ishida, and K. Tohma) vol. 23, No. 4–2, 1999, p. 1017–1020.

* cited by examiner

Primary Examiner—Holly Rickman
(74) Attorney, Agent, or Firm—Darby & Darby

(57) ABSTRACT

A magnetic recording medium achieves excellent noise reduction by controlling the crystal orientation of a magnetic layer without thermal processing. The magnetic recording medium includes multiple layers laminated to a substrate. These layers include at least the magnetic layer and a non-magnetic under layer. The magnetic layer has a granular structure consisting of ferromagnetic grains with a hexagonal close-packed structure and non-magnetic grain boundaries composed mainly oxide or a nitride. The non-magnetic under-layer is a material having a body centered cubic crystal structure with a preferential orientation along a (200) plane parallel to a film surface of the under-layer.

19 Claims, 4 Drawing Sheets

MAGNETIC RECORDING MEDIUM AND MANUFACTURING METHOD THEREFORE

BACKGROUND OF THE INVENTION

1. Field of the Invention

The present invention relates to a magnetic recording medium and a method for manufacturing the same. More particularly, the present invention relates to a magnetic recording medium used in magnetic recording devices, for example in computers.

2. Description of the Related Art

High quality magnetic recording mediums require both high recording density and low noise. In an effort to achieve these goals, various compositions and structures for magnetic layers and non-magnetic under-layers have been proposed. Recently, a magnetic layer called a granular magnetic layer has been proposed having a structure, in which a ferromagnetic grain is surrounded by a non-magnetic and non-metallic substance, such as an oxide or a nitride.

Technology related to the granular magnetic layer is shown in Japanese Unexamined Patent Application Publication No. H8-255342 and U.S. Pat. No. 5,679,473.

In Japanese No. H8-255342, a method for manufacturing a magnetic recording medium comprises multiple steps. These steps include, sequentially depositing, on a non-magnetic substrate, a non-magnetic film, a ferromagnetic film and a non-magnetic film, and heat-treating the resulting lamination. This process forms a recording layer in which ferromagnetic grains are dispersed in the non-magnetic film.

The technology of this disclosure proposes to attain low noise by means of forming a granular recording layer in which ferromagnetic grains are dispersed in a non-magnetic film structure. Silicon oxide and nitride are used for the non-magnetic film in this technology.

U.S. Pat. No. 5,679,473 discloses the formation of a low noise granular recording film by means of RF sputtering using a CoNiPt target containing an oxide additive, such as $SiO_2$. In this granular recording film, each magnetic grain is surrounded and separated from others by a non-magnetic oxide.

Reduced recording noise is obtained since each of the magnetic grains in the above granular magnetic film is physically separated along a grain boundary by a non-magnetic and non-metallic phase thus reducing magnetic interaction between the magnetic grains, and suppressing the formation of magnetic domain walls having a zigzag shape at the transition region of a recording bit.

In conventional Co—Cr metallic magnetic film, to reduce magnetic interaction between the individual magnetic grains, chromium is segregated from a cobalt alloy magnetic grain toward a grain boundary. In the conventional Co—Cr metallic magnetic layer, when laminating the layer, heating the substrate to 200° C. is essential for sufficient segregation of chromium.

In the conventional granular magnetic layer, the grain boundary phase is a non-magnetic and a non-metallic substance, which segregates more easily than the conventional, thereby enhancing isolation of the magnetic grains.

The granular magnetic layer has the advantage that the non-magnetic and non-metallic substance segregates evenly in lamination without heating.

Unfortunately, high density, together with low noise of magnetic recording mediums require both reduction of magnetic interaction between the grains due to enhancement of the segregation structure in the magnetic layer, and control of crystal orientation of Co—Cr ferromagnetic grain.

More specifically, the c-axis of the ferromagnetic grains requires a hexagonal closed-packed grain structure to align the grains in the plane of the film surface. The control of the crystal orientation of the magnetic layer in conventional magnetic recording mediums having metallic magnetic layers is accomplished by controlling structure and crystal orientation of the non-magnetic under-layer.

In conventional magnetic recording mediums having a granular magnetic film, the effect of an under-layer is small since the ferromagnetic grains are separated from the under-layer by the segregation substance comprising the grain boundary, namely an oxide.

A publication entitled "Effect of Cr—Mo under-layer in CoPt—$SiO_2$" in "Nihon Oyojiki Gakkaishi" ((Journal of the Japanese Society for Applied Magnetics) Vol. 23, No. 4–2, pp. 1017–1020 (1999)) discloses that using an under-layer of a special composition of a Cr-Mo alloy (having a preferential orientation in the (110) plane) causes preferential orientation of the (100) plane and the (101) plane in ferromagnetic grains in a granular magnetic layer. Use of such an under-layer results in an improvement of magnetic property and electromagnetic conversion characteristics.

Unfortunately, when a ferromagnetic grain has a preferential orientation of it's the (101) plane, the c-axis does not align parallel to the film surface. Instead, the c-axis rises up from the film surface at an angle. As a result, the magnetic anisotropy of the crystal grain contains a component perpendicular to the film surface. This perpendicular component creates a corresponding perpendicular component of magnetization, resulting in increased media noise.

The preferential orientation of the (101) plane in the ferromagnetic grain is caused by the preferential orientation of (110) plane in the CrMo alloy under-layer. As a result, the orientation control of a magnetic layer, disclosed in the reference, must be regarded as insufficient. In sum, more precise control of crystal orientation is needed for obtaining a low noise medium.

OBJECTS AND SUMMARY OF THE INVENTION

It is an object of the present invention to provide a magnetic recording medium that overcomes the concerns raised above.

It is another object of the present invention to provide a magnetic recording medium and method for manufacture that allows more precise control of crystal orientation without thermal processing.

It is another object of the present invention to provide a magnetic recording medium having a low recording noise.

It is another object of the present invention to provide a method for manufacturing a magnetic recording medium that has low noise.

It is another object of the present invention to provide a medium and manufacturing method therefore which achieves the above objects and overcomes the above-noted concerns.

Briefly stated, the present invention provides a magnetic recording medium achieves excellent noise reduction by controlling the crystal orientation of a magnetic layer without thermal processing. The magnetic recording medium includes multiple layers laminated to a substrate. These layers include at least the magnetic layer and a non-magnetic under layer. The magnetic layer has a granular structure consisting of ferromagnetic grains with a hexagonal close-packed structure and non-magnetic grain boundaries composed mainly oxide or a nitride. The non-magnetic under-layer is a material having a body centered cubic crystal structure with a preferential orientation along a (200) plane parallel to a film surface of the under-layer. The present invention also provides a manufacturing process for the above-noted product.

According to an embodiment of the invention there is provided a magnetic recording medium, comprising: a non-magnetic substrate, at least a non-magnetic under-layer on the non-magnetic substrate, at least a magnetic layer on the non-magnetic under-layer, at least a protective layer on the magnetic layer, the magnetic layer having a substantially granular structure, the substantially granular structure including at least a plurality of ferromagnetic grains having a non-magnetic grain boundary phase surrounding the plurality of ferromagnetic grain, the plurality of ferromagnetic grains each having a hexagonal close-packed lattice structure, the non-magnetic grain boundary phase including at least one of a metal oxide and a metal nitride, and the non-magnetic under-layer having a body-centered cubic crystal lattice structure and a preferential crystal orientation of (200) plane parallel to a film surface of the non-magnetic under-layer, whereby a c-axis of each the ferromagnetic grain preferentially aligns parallel to the film surface and minimizes a perpendicular component of magnetization in the magnetic layer thus reducing noise.

According to another embodiment of the invention there is provided a magnetic recording medium, further comprising: a non-magnetic intermediate layer between the magnetic layer and the non-magnetic under layer, and the non-magnetic intermediate layer having a hexagonal close-packed lattice structure.

According to another embodiment of the invention there is provided a magnetic recording medium, further comprising: a non-magnetic alignment-control layer, the non-magnetic alignment-control layer between the non-magnetic under layer and the non-magnetic substrate, the non-magnetic alignment control layer having a cubic lattice structure, and the non-magnetic alignment-control layer having a crystal orientation plane parallel to a second film surface of the non-magnetic alignment-control layer, and the crystal orientation plane is a (100) plane.

According to another embodiment of the invention there is provided a magnetic recording medium, wherein: the non-magnetic alignment-control layer includes at least one material selected from a group consisting of oxides of Mg, Ti, and V, and carbides and nitrides of Ti, Zr, Hf, NB, Ta, Mo, and W.

According to another embodiment of the invention there is provided a magnetic recording medium, further comprising: a non-magnetic intermediate layer, the non-magnetic intermediate layer between the magnetic layer and the non-magnetic under layer, the non-magnetic intermediate layer having a hexagonal close-packed lattice structure, anon-magnetic alignment-control layer, the non-magnetic alignment control layer between the non-magnetic under layer and the non-magnetic substrate, the non-magnetic alignment-control layer having a cubic lattice structure, and the non-magnetic alignment-control layer having a crystal orientation plane parallel to a second film surface of the non-magnetic alignment-control layer, and the crystal orientation plane is a (100) plane.

According to another embodiment of the invention there is provided a magnetic recording medium, wherein: the non-magnetic alignment-control layer includes at least one material selected from a group consisting of oxides of Mg, Ti, and V, and carbides and nitrides of Ti, Zr, Hf, NB, Ta, Mo, and W.

According to another embodiment of the invention there is provided a magnetic recording medium, further comprising: a seed layer, the seed layer between at least the non-magnetic alignment-control layer and the substrate, and the seed layer having an amorphous structure.

According to another embodiment of the invention there is provided a magnetic recording medium, wherein: the seed layer includes of a nickel layer containing from 10 at % to 40 at % of phosphorus.

According to another embodiment of the invention there is provided a magnetic recording medium, wherein: the seed layer includes a silicon layer containing from 25 at % to 55 at % of oxygen.

According to another embodiment of the invention there is provided a magnetic recording medium, further comprising: a seed layer, the seed layer between at least the non-magnetic alignment-control layer and the substrate, and the seed layer having an amorphous structure.

According to another embodiment of the invention there is provided a magnetic recording medium, wherein: the seed layer includes of a nickel layer containing from 10 at % to 40 at % of phosphorus.

According to another embodiment of the invention there is provided a magnetic recording medium, wherein the seed layer includes a silicon layer containing from 25 at % to 55 at % of oxygen.

According to another embodiment of the invention there is provided a magnetic recording medium, wherein: the non-magnetic substrate includes a material selected from the group consisting of crystallized glass, chemically strengthened glass and resin.

According to another embodiment of the invention there is provided a magnetic recording medium, wherein: the non-magnetic under layer has a thickness from 5 nm to 100 nm.

According to another embodiment of the invention there is provided a magnetic recording medium, wherein: the non-magnetic intermediate layer has a thickness from 2 nm to 20 nm.

According to another embodiment of the invention there is provided a magnetic recording medium, wherein: the non-magnetic intermediate layer has a thickness from 2 nm to 20 nm.

According to another embodiment of the invention there is provided a magnetic recording medium, wherein: the plurality of ferromagnetic grains are crystalline grains of a CoPt alloy, and the CoPt alloy is doped with at least one material selected from a group consisting of Cr, Ni, and Ta, whereby magnetic recording properties are improved.

According to another embodiment of the present invention there is provided a method for manufacturing a magnetic recording medium comprising the steps of: selecting a non-magnetic substrate, laminating at least a non-magnetic under-layer on the non-magnetic substrate, the non-magnetic under-layer being a material having a body-centered cubic lattice structure and preferential crystal orientation plane in a (200) plane parallel to a film surface of the non-magnetic under-layer, laminating at least a magnetic layer on the non-magnetic under-layer, the magnetic layer including a plurality of ferromagnetic grains having a hexagonal close-packed structure and a non-magnetic grain boundary phase surrounding the plurality, the non-magnetic grain boundary phase being at least one of a group consisting of a metal oxide and a metal nitride, laminating a protective layer on the magnetic layer, laminating a liquid lubricant layer on the protective layer, and conducting the steps of laminating without a step of heating.

According to another embodiment of the present invention there is provided a method for manufacturing a magnetic recording medium, further comprising the step of: forming a non-magnetic intermediate layer prior to the step of forming the magnetic layer, between the non-magnetic under-layer and the magnetic layer, the non-magnetic intermediate layer having a hexagonal close-packed structure.

According to another embodiment of the present invention there is provided a method for manufacturing a magnetic recording medium, further comprising the step of: forming a non-magnetic alignment-control layer prior to forming the non-magnetic under-layer, and a preferential crystal orientation plane in a (100) plane parallel to a film surface of the non-magnetic alignment-control layer.

According to another embodiment of the present invention there is provided a method for manufacturing a magnetic recording medium, wherein the alignment-control layer includes at least one material selected from the group consisting of oxides of Mg, Ti, and V, and carbides and nitrides of Ti, Zr, Hf, Nb, Ta, Mo and W.

According to another embodiment of the present invention there is provided a method for manufacturing a magnetic recording medium, further comprising the step of: forming a seed layer having amorphous structure between the non-magnetic alignment-control layer and the substrate.

According to another embodiment of the present invention there is provided a method for manufacturing a magnetic recording medium, wherein: the seed layer includes a nickel layer containing from 10 at % to 40 at % of phosphorus.

According to another embodiment of the present invention there is provided a method for manufacturing a magnetic recording medium, wherein: the seed layer includes a silicon layer containing from 25 at % to 55 at % of oxygen.

According to another embodiment of the present invention there is provided a method for manufacturing a magnetic recording medium, wherein the non-magnetic substrate includes at least a first substrate material selected from the group consisting of crystallized glass, chemically strengthened glass and resin.

According to another embodiment of the present invention there is provided a method for manufacturing a magnetic recording medium, wherein: a step of heating the substrate is not performed preceding any one of the steps for lamination.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
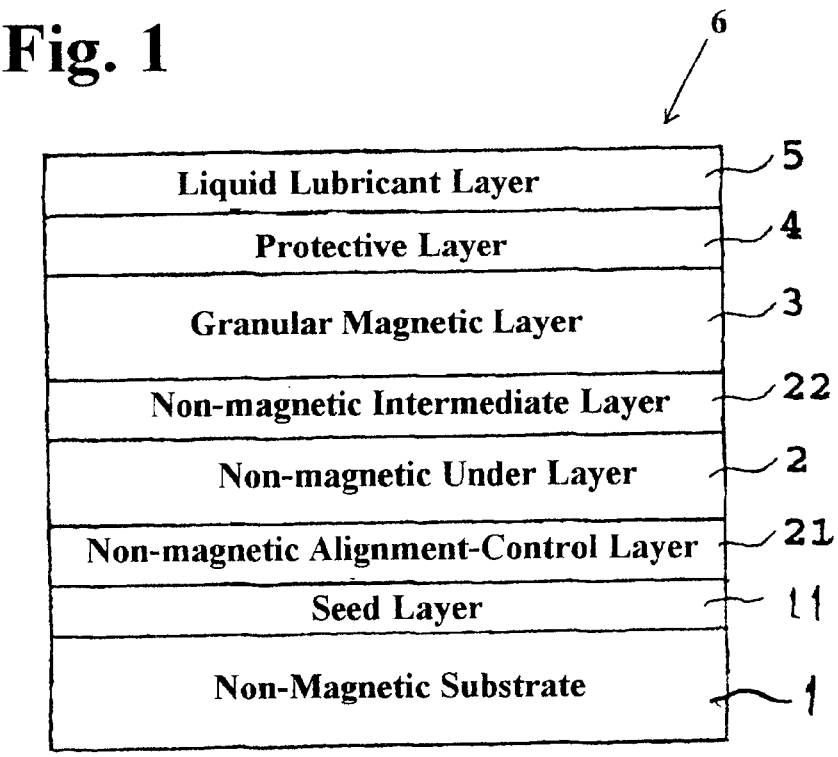
FIG. 1 is a schematic cross-sectional view showing a basic structure of a magnetic recording medium according to the present invention.

The inventors of the present invention have conducted profound studies on controlling crystal orientation in granular magnetic films, and have found the following results. Namely, the inventors have found that excellent magnetic properties and electromagnetic conversion characteristics are achievable when a granular magnetic film, composed of ferromagnetic grains having a hexagonal close-packed structure (such as Co—Pt alloy), is formed using a non-magnetic under-layer made from a material that has a body-centered cubic crystal structure with a preferential orientation of a (200) plane parallel to the film surface.

Based on this finding, the magnetic recording medium and method of present invention comprises at least a non-magnetic substrate; and a non-magnetic under-layer, a magnetic layer, a protective film, and a liquid lubricant layer sequentially laminated on the substrate, as will be described.

The magnetic layer has a granular structure that contains a plurality of ferromagnetic grains having a hexagonal close-packed structure and non-magnetic grain boundaries (surrounding the grains) mainly composed of an oxide. The non-magnetic under-layer has a crystal structure of a body-centered cubic lattice and a preferential crystal orientation plane of (200) parallel to a film surface of the under-layer.

A reader skilled in the art of the present invention should understand that referring to, for example "a (200) plane", indicates reference to a set of Miller indices in a material's crystal lattice structure. Thus, the reader should readily recognize references to 'lattices,' 'crystal structure,' and "(a:b:c)" as indicating an interchangeable discussion of relative crystal or lattice planes in the particular substance or group of substances in interest.

It should be understood, that any three-dimensional crystal array, must have some type of recognizable internal structure referrably to one of the Bravais lattices.

By employing such an under-layer, the c-axis of the ferromagnetic grains in the granular magnetic layer laminated on the under-layer align parallel to the film surface and prevent development of a perpendicular component of magnetization. Preventing a perpendicular magnetization component achieves the favorable characteristics desired for a recording medium of the present invention.

In a refinement to the above, a non-magnetic intermediate layer(described later), having a hexagonal close-packed crystal structure, the same as that of the ferromagnetic grains of the granular magnetic layer, is formed between the under-layer and the magnetic layer. As a result of this refinement, c-axis alignment of the ferromagnetic grains of the magnetic layer is enhanced thereby further reducing recording noise. The intermediate layer may have a variable composition capable of meeting the above requirements, but may be of constructed from a CoCr alloy containing from about 30 at % to about 50 at % of Cr.

In a further effort to effectively control crystal orientation of the under-layer, a non-magnetic alignment-control layer (described later) may be formed prior to depositing the under-layer. This non-magnetic alignment-control layer has a body-centered cubic (BCC) crystal lattice structure and a preferential crystal orientation plane parallel to its film surface of (100) plane.

The alignment-control layer is preferably made of an oxide or oxides having at least one element selected from Mg, Ti, and V, or a carbide(s) or a nitride(s) with at least one element selected from Ti, Zr, Hf, Nb, Ta, Mo and W. Each of these materials has a body-centered cubic lattice structure. Preferential crystal orientation in a (100) plane is readily obtained by the sputtering deposition method.

A seed layer (later described) maybe formed between the substrate and the non-magnetic alignment-control layer to effectively control crystal orientation and crystallinity of the alignment-control layer.

The seed layer has a desired amorphous structure, but the partial crystallization inevitably generated by the sputtering deposition method does not significantly influence the effect directed by the seed layer.

The seed layer is preferably constructed with a nickel layer containing from about 10 at % to about 40 at % of phosphorus or a silicon layer containing from about 25 at % to about 55 at % of oxygen.

In contrast to the conventional art, heating of the substrate is not required in laminating the present invention because the above-described excellent magnetic characteristics and electromagnetic conversion characteristics are easily achieved by employing the selected layer structure described above.

As a consequential benefit, not only is the manufacturing process simplified and the production cost reduced, but also it becomes possible to employ a low-cost plastic substrate instead of the conventional aluminum or glass substrate.

Referring now to FIG. 1, a magnetic recording medium 6 includes a supporting non-magnetic substrate 1. A non-magnetic under-layer 2 (additionally referred to as under-layer 2), a granular magnetic layer 3 (additionally referred to as magnetic layer 3), and a protective layer 4 are formed sequentially on top of non-magnetic substrate 1. A liquid lubricant layer 5 is deposited on top of protective layer 4, as will be described. Layers 1–5 form the basis for all further embodiments of the present invention. Additional layers, described later, further enhance the basic invention.

Examples of non-magnetic substrate 1 include a Ni—P plated aluminum alloy, a strengthened glass or a crystallized glass. Since the present invention does not require thermal treatment during formation, a substrate produced by injection-molding a resin, such as polycarbonate or polyolefin, may also be used.

Protective layer 4 may include a thin film consisting mainly of carbon. Liquid lubricant layer 5 may employ, for example, a perfluoropolyether lubricant.

Granular magnetic layer 3 is a ferromagnetic layer containing a plurality of ferromagnetic grains with non-magnetic grain boundaries surrounding each grain.

The ferromagnetic crystal grains may be several materials but preferably comprise a CoPt alloy. To further reduce media noise, the CoPt alloy may be doped with Cr, Ni or Ta.

The non-magnetic grain boundary material is composed of metal oxides or metal nitrides. Granular magnetic layer 3 is produced by sputtering deposition using a target of ferromagnetic metal containing the oxide that composes the non-magnetic grain boundary. Alternatively, granular magnetic layer 3 may be produced by reactive sputtering deposition in an oxygen-containing argon gas atmosphere using a ferromagnetic metal as a target.

The non-magnetic grain boundary material may be selected from oxides of Cr, Co, Si, Al, Ti, Ta, Hf or Zr, each of which form a favorably stable granular structure. The thickness of the ferromagnetic granular magnetic layer 3 must be sufficient to be capable of obtaining sufficient head-reproduction output upon recording and reproduction.

Non-magnetic under-layer 2 is made from a material having a body centered cubic (BCC) structure with a preferential crystal orientation along a (200) plane. This material may preferably be a chromium or chromium alloy. The chromium alloy is preferably an alloy selected from CrMo, CrTi, CrV, and CrW for example.

The thickness of non-magnetic under-layer 2 is preferably in the range from about 5 nm to about 100 nm with a preferential crystal orientation along a (200) plane.

In the embodiment shown, a non-magnetic alignment control layer 21 (described later) is formed between non-magnetic under-layer 2 and non-magnetic substrate 1. Non-magnetic alignment control layer 21 serves as a means for controlling the crystal orientation of under-layer 2 and for obtaining preferential crystal orientation in the (200) plane of non-magnetic under layer 2. Other means for obtaining preferential crystal orientation include the application of substrate bias voltage or application of grid bias voltage as well as the control of other conditions during deposition of non-magnetic under-layer 2.

Non-magnetic alignment-control layer 21 has a simple cubic structure. Non-magnetic alignment-control layer 21 has a preferentially oriented crystal plane that is in parallel to the film surface (100) plane. Non-magnetic alignment control layer 21 is preferably made from an oxide(s) of at least an element selected from Mg, Ti and V, or a carbide(s) or a nitride(s) of at least an element selected from Ti, Zr, Hf, Nb, Ta, Mo and W.

All of the above-described materials have simple cubic structures. All may be deposited by sputtering to easily obtain the preferential crystal orientation of a (100) plane. The film thickness of non-magnetic alignment-control layer 21 must be sufficient to control the crystal alignment in non-magnetic under-layer 2.

A non-magnetic intermediate layer 22 is deposited between non-magnetic under-layer 2 and granular magnetic layer 3. Non-magnetic intermediate layer 22 serves as a means to suitably control the c-axis alignment of the ferromagnetic grains of granular magnetic layer 3.

The crystal structure of non-magnetic intermediate layer 22 is preferably a hexagonal close-packed structure that is the same as the crystal structure of the ferromagnetic grains of magnetic layer 3. Non-magnetic intermediate layer 22 is preferably a CoCr alloy containing chromium in the range from about 30 at % to 50 at %. The thickness of non-magnetic intermediate layer 22 is preferably in the range from about 2 nm to about 20 nm.

A seed layer 11 is deposited between non-magnetic substrate 1 and non-magnetic alignment-control layer 21. During manufacture, seed layer 11 is applied to effectively control both the crystal orientation and the crystallinity of non-magnetic alignment-control layer 21.

Seed layer 11 preferably has a completely amorphous structure but is not adversely affected by partial crystallization. Since seed layer 11 is usually generated by sputtering deposition, the fact of inevitable partial crystallization does not adversely impact the effectiveness of seed layer 11.

Seed layer 11 serves as a means for improving the crystal orientation and crystallinity of alignment-control layer 21. Seed layer 11 is formed with a nickel layer containing phosphorus in an amount of from about 10 at % to about 40 at % or with a silicon layer containing oxygen in an amount of from about 25 at % to about 55 at %. The thickness of seed layer 11 may be any value effective to control the crystal orientation and crystallinity of non-magnetic alignment-control layer 21.

Magnetic recording medium 6 is easily produced without the conventional step of substrate heating. This offers a simplified manufacturing process and much lower manufacturing costs. Magnetic recording medium 6, having the layered structure described above, has the high Hc and the low media noise greatly desired by customers.

During manufacture of magnetic recording medium 6, each respective layer is applied sequentially. The examples listed below provide specific preferred embodiments of the present invention.

EXAMPLE 1

Figure 2:
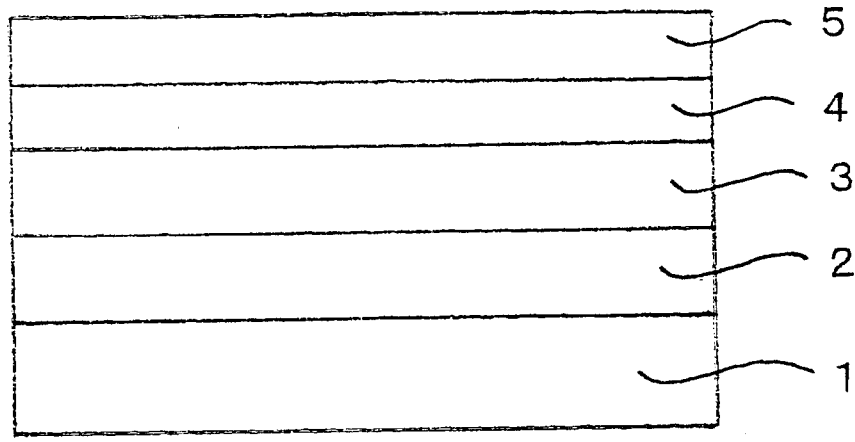
FIG. 2. is a schematic cross-sectional view showing a basic structure of a magnetic recording medium produced in Example 1.

Referring now to FIG. 2, a chemically strengthened glass substrate (N-10 glass substrate manufactured by Hoya Corp.) with a smooth surface was used as substrate 1. After cleaning, substrate 1 was introduced into a sputtering apparatus. Non-magnetic under-layer 2, having thickness of 30 nm was formed of Cr-20 at % Mo on substrate 1 under an argon gas pressure of 5 mTorr.

Subsequently, granular magnetic layer 3, having thickness of 20 nm, was formed on the under-layer by an RF sputtering method using a target of $Co_{76}Cr_{12}Pt_{12}$ containing 10 mol % of $SiO_2$ under an argon gas pressure of 3 mTorr.

Next a carbon based protective layer 4, 10 nm thick, was laminated on magnetic layer 3. The laminate was then removed from the vacuum vessel and liquid lubricant 5, having a 1.5 $\mu$m thickness, was applied to the protective layer.

An RF bias was applied to the substrate, varying from 0 W to 200 W, during the deposition of under-layer 2. Heating of the substrate prior to the lamination step was not carried out.

Figure 3:
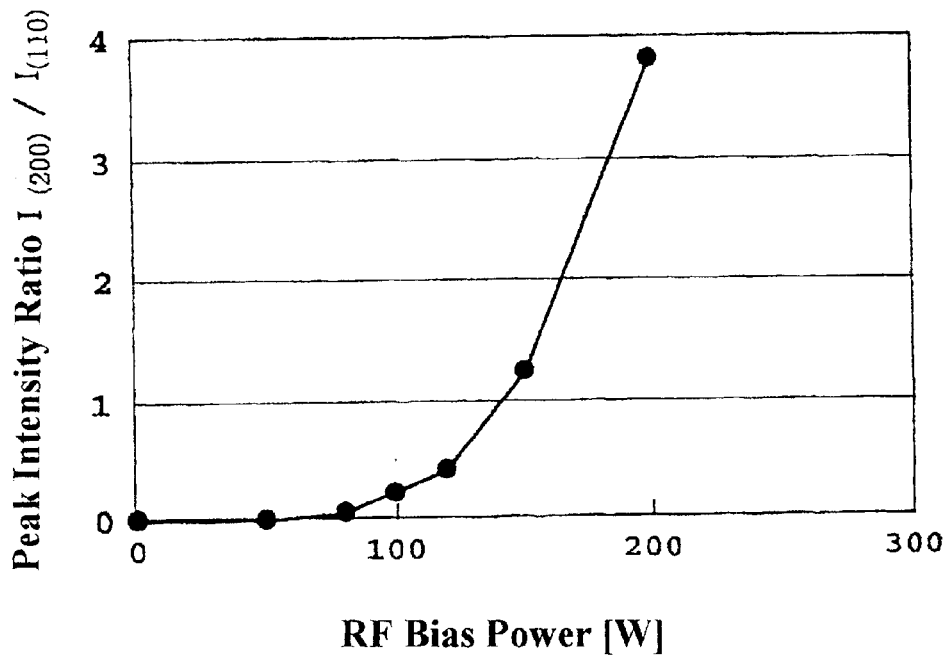
FIG. 3 is a graph showing variation of intensity ratio $I_{(200)}/I_{(110)}$ with respect to an applied RF bias power, the intensity ratio being the ratio of diffraction peak intensity $I_{(200)}$ from the CrMo (200) plane to diffraction peak intensity $I_{(110)}$ from the CrMo (110) plane, obtained from X-ray diffraction profiles of the media produced in Example 1.

Referring now to FIG. 3, X-ray diffraction analysis was made on each of the thus produced recording media. From the measured profile, an intensity ratio $I_{(200)}/I_{(110)}$ was obtained that is the ratio of diffraction peak intensity $I_{(200)}$ from CrMo (200) plane to diffraction peak intensity $I_{(110)}$ from CrMo (110) plane. FIG. 3 shows that the variation of the intensity ratio $I_{(200)}/I_{(110)}$ depends on the applied RF bias power. The X-ray diffraction profile was measured with Cu—K$\alpha$ line using a goniometer.

It is apparent that the intensity ratio $I_{(200)}/I_{(110)}$ sharply increases with an increase of the bias power. Application of the bias power of 100 W or more raises the intensity ratio $I_{(200)}/I_{(110)}$ to the value greater than 0.2. Since the intensity ratio $I_{(200)}/I_{(110)}$ for random crystal orientation is 0.16, the intensity ratio $I_{(200)}/I_{(110)}$ greater than 0.16 may be interpreted as indicating that the (200) plane is preferentially oriented.

Figure 4:
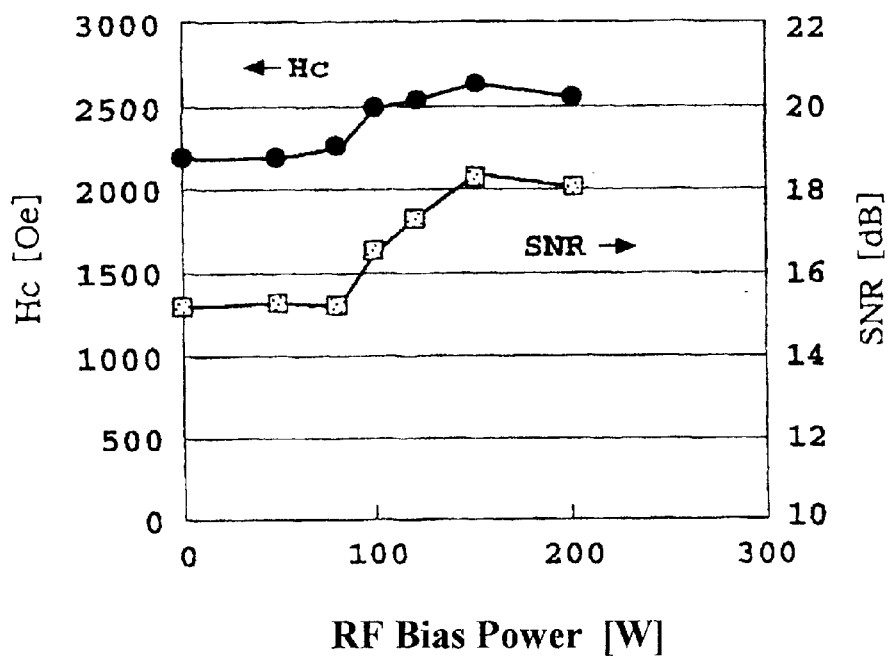
FIG. 4 is a graph showing coercive force Hc and signal-to-noise ratio SNR at a linear recording density of 270 kFCl of the media produced in Example 1 with respect to applied RF bias power.

Additionally referring now to FIG. 4, coercive force Hc was measured for the produced media using a vibrating sample magnetometer (VSM). Signal-to-noise ratio (SNR) at the linear recording density of 270 kFCl was measured by a spinning stand tester using a GMR head.

Variation of the measured coercive force Hc and the signal-to-noise ratio (SNR) with respect to the applied RF bias power is shown in FIG. 4. High coercive force Hc and high signal-to-noise ratio SNR are simultaneously obtained when RF bias of 100 W or more is applied. Thus, by employing under-layer 2 with preferential orientation of (200) plane, excellent magnetic characteristic and electromagnetic conversion characteristic are accomplished.

EXAMPLE 2

Figure 5:
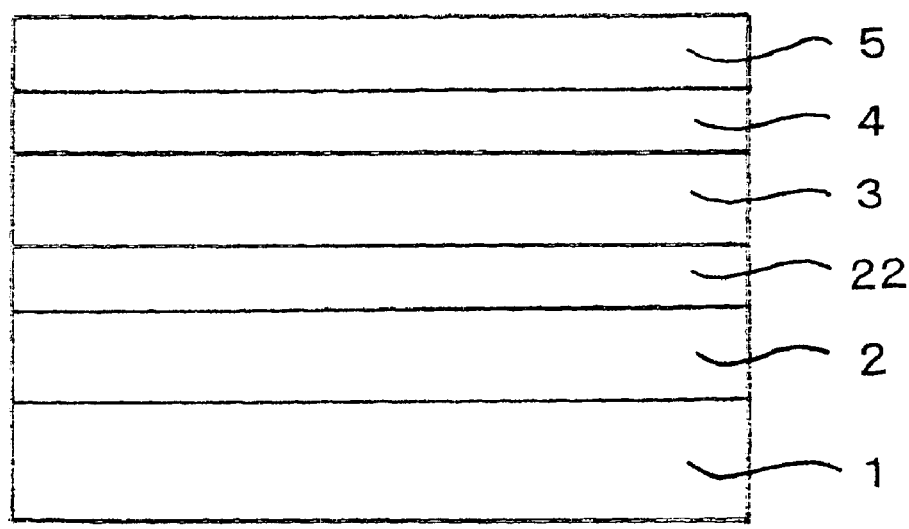
FIG. 5. is a schematic cross-sectional view showing a basic structure of a magnetic recording medium produced in Example 2.

Referring now to FIG. 5, another embodiment of a magnetic recording medium was produced in the same manner as in Example 1 except that a non-magnetic intermediate layer 22 was formed on under-layer 3. Non-magnetic intermediate layer 22 was formed under an argon gas pressure of 5 mTorr after laminating under-layer 2 on substrate 1. Non-magnetic intermediate layer 22 was formed using an alloy of Co-35 at % Cr having thickness of about 5 nm. RF bias of 150 W was applied when under-layer 2 was formed.

As in Example 1, coercive force Hc was measured for the produced medium using a vibrating sample magnetometer (VSM). Signal-to-noise ratio (SNR) at the linear recording density of 270 KFCl was measured by a spinning stand tester using a GMR head.

The results are shown in Table 1 below. For comparison, Table 1 also shows, the characteristics of a medium without an intermediate layer 22 (as in Comparative Example 1) to which an RF bias of 150 W was applied.

As noted in Table 1, when intermediate layer 22 is not present, the coercive force Hc was about 2,620 Oe and the signal-to-noise ratio SNR was 18.3 dB. When a non-magnetic intermediate layer of Co-35 at % Cr, having the hexagonal closest packed crystal structure and 5 nm thickness, was formed both the coercive force Hc and the signal-to-noise ratio SNR (to 19.5 dB) were improved.

TABLE 1

|  | intermediate layer | Hc (Oe) | SNR (dB) |
|---|---|---|---|
| Example 2 | provided | 3,010 | 19.5 |
| Comp Example 1 | not provided | 2,620 | 18.3 |

EXAMPLE 3

Figure 6:
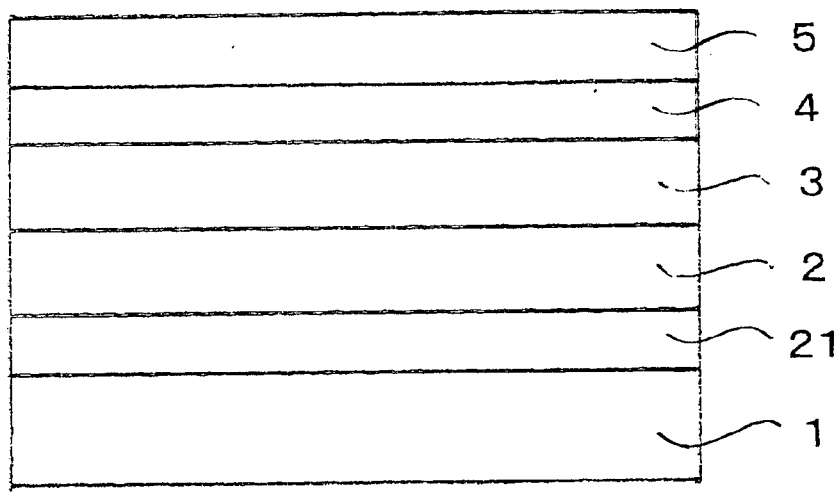
FIG. 6. is a schematic cross-sectional view showing a basic structure of a magnetic recording medium produced in Example 3.

Referring now to FIG. 6, three media embodiments (I, ii, and iii, shown later) of magnetic recording media were produced, as in Example 1, with the exception that non-magnetic alignment-control layer 21 was formed between non-magnetic substrate 1 and non-magnetic under layer 2.

In this example, non-magnetic alignment-control layer 21, having a thickness of 30 nm, was formed by RF sputtering using various material under argon gas pressure of 8 mTorr before applying under-layer 2. RF bias was not applied during lamination of under-layer 2.

As in Examples 1 and 2, coercive force Hc was measured for each of the produced embodiments using a vibrating sample magnetometer (VSM). A signal-to-noise ratio (SNR), at the linear recording density of 270 KFCl, was measured by a spinning stand tester using a GMR head. The results are shown in Table 2.

Table 2 also shows intensity ratio $I_{(200)}/I_{(110)}$ of the X-ray diffraction peaks of the under-layer of each medium. Table 2 further shows, for comparison, the characteristics of a medium without alignment-control layer 21. This was a medium of Comparative Example 2, which was one of the media in Example 1 to which RF bias was not applied.

Each media embodiment (I) to (iii) included a non-magnetic alignment-control layer 21 according to the present invention. Alignment-control layer 21 has a simple cubic lattice structure in which the preferential crystal orientation plane that is parallel to the film surface of the layer is the (100) plane.

For each media (I) to (iii), RF bias was not applied when under-layer 2 was formed. Each media (I) to (iii) exhibits an intensity ratio $I_{(200)}/I_{(110)}$ in the under-layer 2 of as high as 1.0 or more. These values indicate strong preferential orientation along a (200) plane. As a result, excellent magnetic characteristic and electromagnetic conversion characteristic were attained.

TABLE 2

|  |  | alignment-control layer | $I_{(200)}/I_{(110)}$ | Hc (Oe) | SNR (dB) |
| --- | --- | --- | --- | --- | --- |
| Example 3 | medium I | TiC | 3.1 | 2,530 | 18.4 |
|  | medium ii | TiN | 1.2 | 2,610 | 18.1 |
|  | medium iii | MgO | 6.5 | 2,750 | 19.8 |
| Comp Example 2 |  | none | 0 | 2,200 | 15.2 |

EXAMPLE 4

Figure 7:
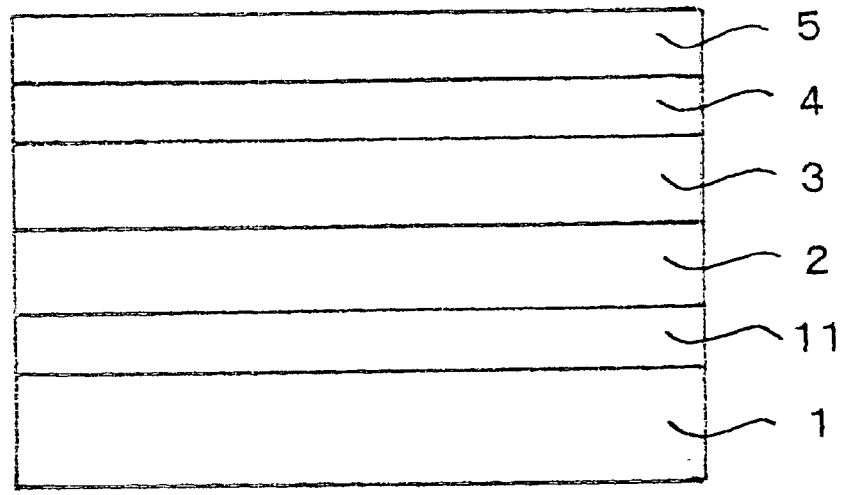
FIG. 7. is a schematic cross-sectional view showing a basic structure of a magnetic recording medium produced in Example 4.

Referring now to FIG. 7, an embodiment of a magnetic recording media was produced in the same manner as in Example 1 except that seed layer 11 and a non-magnetic alignment layer were applied between non-magnetic substrate 1 and non-magnetic under layer 2.

Seed layer 11 was formed by RF sputtering using various materials under the argon gas pressure of 5 mTorr and had a thickness of 30 nm. The subsequent non-magnetic alignment-control layer 21 of MgO, having thickness of 30 nm, was formed by RF sputtering prior to laminating under-layer 2. RF bias was not applied when under-layer 2 was laminated on non-magnetic alignment-control layer 21.

As in Examples 1, 2 and 3, coercive force Hc was measured for each of the produced media using a vibrating sample magnetometer (VSM). Signal-to-noise ratio (SNR) was measured for each produced media at the linear recording density of 270 kFCI. Signal-to-noise ratio (SNR) was measured by a spinning stand tester using a GMR head.

The results are shown in Table 3. Table 3 also shows intensity ratio $I_{(200)}/I_{(110)}$ of the X-ray diffraction peaks of the under-layer of each medium. Table 3 further gives, for comparison, the characteristics of a medium without seed layer 11, (as in medium (iii) of Example 3) but with alignment-control layer 21 made of MgO.

TABLE 3

|  |  | seed layer | $I_{(200)}/I_{(110)}$ | Hc (Oe) | SNR (dB) |
| --- | --- | --- | --- | --- | --- |
| Example 4 | medium I | Ni-25 at % P | 32.8 | 3,240 | 22.7 |
|  | medium ii | Si-45 at % O | 17.9 | 2,960 | 21.1 |
| Comp Example 3 |  | none | 6.5 | 2,750 | 19.8 |

As is apparent from Table 3, when seed layer 11 is provided under the under-layer 21, medium I and ii exhibit significantly higher intensity ratio $I_{(200)}/I_{(110)}$ and crystal orientation, and the crystallinity of alignment-control layer 21 is more effectively upgraded.

Seed layer 11 significantly improves the effectiveness of non-magnetic alignment-control layer 21. The combination of seed layer 11 and non-magnetic alignment-control layer 21 brings strong preferential orientation along the (200) plane. As a result, more favorable magnetic characteristic and electromagnetic conversion characteristic were achieved.

As shown above, the present invention exhibits both excellent magnetic characteristics and excellent electromagnetic conversion characteristic.

In the present invention, granular magnetic layer film 3 is formed from ferromagnetic grains having a hexagonal close-packed structure (as in CoPt alloy), and non-magnetic under-layer 2 employs a material in which the lattice structure is body centered cubic (BCC) in which the preferential crystal orientation plane parallel to the film surface is a (200) plane.

In the ferromagnetic grains of granular magnetic layer 3, the c-axis of the grain aligned parallel to the film surface prevents development of a perpendicular magnetization component. Since perpendicular magnetization components in the granular magnetic layer 3 are prevented, favorable magnetic characteristics are easily achieved.

The c-axis alignment of the ferromagnetic grains of granular magnetic layer 3 are further enhanced when a non-magnetic intermediate layer 22, having a hexagonal close-packed structure (the same crystal structure as that of the ferromagnetic grains of granular magnetic layer 3), is formed between under-layer 2 and magnetic layer 3.

Non-magnetic alignment-control layer 21 is effective to control crystal orientation of non-magnetic under layer 2. Non-magnetic alignment-control layer 21 has a crystal lattice of simple cubic structure and a preferred crystal orientation plane parallel to its film surface along a (100) plane.

Non-magnetic alignment-control layer 21 is preferably made of an oxide having at least one element selected from the group consisting of Mg, Ti, and V, or a carbide or a nitride having at least one element selected from a group consisting of Ti, Zr, Hf, Nb, Ta, Mo and W.

Since each of these materials have a simple cubic lattice structure, the preferential crystal orientation along a (100) plane is readily obtained by sputtering deposition thereby facilitating preferential orientation of a (200) plane in under-layer 2 formed on alignment-control layer 21. Thus, magnetic recording medium 6 is easily produced with excellent magnetic characteristics.

To effectively control the crystal orientation and the crystallinity of alignment-control layer 21, it is desirable to form seed layer 11 above non-magnetic substrate 1. Seed layer 11 has a substantially amorphous structure. While partial crystallization of seed layer 11 is inevitable using sputtering deposition methods, this partial crystallization does not influence the effect controlled by seed layer 11.

Seed layer 11 is preferably made with a nickel layer containing from about 10 at % to about 40 at % of phosphorus or a silicon layer containing from about 25 at % to about 55 at % of oxygen. The existence of seed layer 11 suitably controls the alignment and crystallinity of non-magnetic alignment-control layer 21, thus providing a magnetic recording medium with excellent noise characteristics.

Since the above embodiments easily achieve excellent recording characteristics without heating, inexpensive plastics or resins may be substituted in non-magnetic substrate 1 for the conventional aluminum and glass.

A reader skilled in the art of magnetic recording mediums, crystal structure analysis, or ceramic engineering should recognize that the phase boundaries discussed above and below should substantially or completely separate the relative grains of interest (where indicated). However, the reader should also appreciate that if substantial or complete separation does not occur in specific micro-areas of the substance in question, this will not adversely impact the elements of the embodiment.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims. In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium, comprising:
    a non-magnetic substrate;
    at least a non-magnetic under-layer on said non-magnetic substrate;
    at least a magnetic layer on said non-magnetic under-layer;
    at least a protective layer on said magnetic layer;
    said magnetic layer having a substantially granular structure;
    said substantially granular structure including at least a plurality of ferromagnetic grains having a non-magnetic grain boundary phase surrounding said plurality of ferromagnetic grain;
    said plurality of ferromagnetic grains each having a hexagonal close-packed lattice structure;
    said non-magnetic grain boundary phase including at least one of a metal oxide and a metal nitride;
    said non-magnetic under-layer having a body-centered cubic crystal lattice structure and a preferential crystal orientation of (200) plane parallel to a film surface of said non-magnetic under-layer, whereby a c-axis of each said ferromagnetic grain preferentially aligns parallel to said film surface and minimizes a perpendicular component of magnetization in said magnetic layer thus reducing noise;
    a non-magnetic alignment-control layer;
    said non-magnetic alignment-control layer between said non-magnetic under layer and said non-magnetic substrate;
    said non-magnetic alignment control layer having a cubic lattice structure; and said non-magnetic alignment-control layer having a crystal orientation plane parallel to a second film surface of said non-magnetic alignment-control layer, and said crystal orientation plane is a (100) plane.

2. A magnetic recording medium, according to claim 1, wherein:
    said non-magnetic alignment-control layer includes at last one material selected from a group consisting of oxides of Mg, Ti, and V, and carbides and nitrides of Ti, Zr, Hf, NB, Ta, Mo, and W.

3. A magnetic recording medium, according to claim 1, further comprising:
    a non-magnetic intermediate layer;
    said non-magnetic intermediate layer between said magnetic layer and said non-magnetic under layer; and
    said non-magnetic intermediate layer having a hexagonal close-packed lattice structure.

4. A magnetic recording medium, according to claim 3, wherein:
    said non-magnetic alignment-control layer includes at least one material selected from a group consisting of oxides of Mg, Ti, and V, and carbides and nitrides of Ti, Zr, Hf, NB, Ta, Mo, and W.

5. A magnetic recording medium according to claim 1, further comprising:
    a seed layer; said seed layer between at least said non-magnetic alignment-control layer and said substrate; and said seed layer having an amorphous structure.

6. A magnetic recording medium according to claim 5, wherein:
    said seed layer includes of a nickel layer containing from 10 at % to 40 at % of phosphorus.

7. A magnetic recording medium according to claim 5, wherein:
    said seed layer includes a silicon layer containing from 25 at % to 55 at % of oxygen.

8. A magnetic recording medium, according to claim 3, further comprising:
    a seed layer; said seed layer between at least said non-magnetic alignment-control layer and said substrate; and said seed layer having an amorphous structure.

9. A magnetic recording medium according to claim 8, wherein:
    said seed layer includes of a nickel layer containing from 10 at % to 40 at % of phosphorus.

10. A magnetic recording medium according to claim 8, wherein said seed layer includes a silicon layer containing from 25 at % to 55 at % of oxygen.

11. A magnetic recording medium, according to claim 3, wherein:
    said non-magnetic intermediate layer has a thickness from 2 nm to 20 nm.

12. A method for manufacturing a magnetic recording medium, comprising the steps of:
    selecting a non-magnetic substrate;
    laminating at least a non-magnetic under-layer on said non-magnetic substrate, said non-magnetic under-layer being a material having a body-centered cubic lattice structure and preferential crystal orientation plane in a (200) plane parallel to a film surface of said non-magnetic under-layer;
    laminating at least a magnetic layer on said non-magnetic under-layer; said magnetic layer including a plurality of ferromagnetic grains having a hexagonal close-packed structure and anon-magnetic grain boundary phase surrounding said plurality, said non-magnetic grain boundary phase being at least one of a group consisting of a metal oxide and a metal nitride;

laminating a protective layer on said magnetic layer;

laminating a liquid lubricant layer on said protective layer;

conducting said steps of laminating without a step of heating;

forming a non-magnetic intermediate layer prior to said step of forming said magnetic layer, between said non-magnetic under-layer and said magnetic layer, said non-magnetic intermediate layer having a hexagonal close-packed structure;

forming a non-magnetic alignment-control layer prior to forming said non-magnetic under-layer; and a preferential crystal orientation plane in a (100) plane parallel to a film surface of said non-magnetic alignment-control layer.

13. A method for manufacturing a magnetic recording medium, according to claim 12, wherein said alignment-control layer includes at least one material selected from the group consisting of oxides of Mg, Ti, and V, and carbides and nitrides of Ti, Zr, Hf, Nb, Ta, Mo and W.

14. A method for manufacturing a magnetic recording medium, according to claim 12, further comprising a step of:

forming a seed layer having amorphous structure between said non-magnetic alignment-control layer and said substrate.

15. A method for manufacturing a magnetic recording medium, according to claim 14, wherein:

said seed layer includes a nickel layer containing from 10 at % to 40 at % of phosphorus.

16. A method for manufacturing a magnetic recording medium, according to claim 14, wherein:

said seed layer includes a silicon layer containing from 25 at % to 55 at % of oxygen.

17. A method for manufacturing a magnetic recording medium, according to claim 12, wherein said non-magnetic substrate includes at least a first substrate material selected from the group consisting of crystallized glass, chemically strengthened glass and resin.

18. A magnetic recording medium according to claim 1, wherein:

said non-magnetic substrate includes a material selected from the group consisting of crystallized glass, chemically strengthened glass and resin.

19. A magnetic recording medium, according to claim 1, wherein:

said plurality of ferromagnetic grains are crystalline grains of a CoPt alloy; and said CoPt alloy is doped with at least one material selected from a group consisting of Cr, Ni, and Ta, whereby magnetic recording properties are improved.

* * * * *